United States Patent

Suzuki et al.

[11] Patent Number: 5,622,086
[45] Date of Patent: Apr. 22, 1997

[54] SHIFT LEVER DEVICE AND SLIDE COVER STRUCTURE THEREFOR

[75] Inventors: Kenji Suzuki; Hiroyasu Hasegawa, both of Aichi-ken, Japan

[73] Assignee: Kabushiki Kaisha Tokai-Rika-Denki-Seisakusho, Aichi-ken, Japan

[21] Appl. No.: 543,471

[22] Filed: Oct. 16, 1995

[30] Foreign Application Priority Data

Oct. 19, 1994 [JP] Japan .................................. 6-254015

[51] Int. Cl.$^6$ .................. B60K 1/00; G05G 3/00
[52] U.S. Cl. ........................... 74/566; 74/473 R
[58] Field of Search .................. 74/473 R, 523, 74/524, 525, 528, 566; 116/28.1, 29, DIG. 20, DIG. 21

[56] References Cited

U.S. PATENT DOCUMENTS

| | | | |
|---|---|---|---|
| 2,900,836 | 8/1959 | Gleeson et al. | 74/566 |
| 3,285,093 | 11/1966 | Sellmeyer | 74/566 |
| 3,929,092 | 12/1975 | Ogura | 116/28.1 |
| 3,985,095 | 10/1976 | Nurse | 116/28.1 |
| 4,029,324 | 6/1977 | Berkes | 74/566 X |
| 4,446,809 | 5/1984 | Dennis | 116/28.1 |
| 4,565,151 | 1/1986 | Buma | 116/28.1 |
| 4,630,499 | 12/1986 | Hopkins | 74/566 X |
| 4,798,160 | 1/1989 | Mochida et al. | 116/28.1 |
| 4,991,535 | 2/1991 | Kobayashi et al. | |

FOREIGN PATENT DOCUMENTS

| | | | |
|---|---|---|---|
| 0239313 | 10/1986 | Japan | 74/473 R |
| 6447430 | 3/1989 | Japan | |
| 406159488 | 6/1994 | Japan | 74/473 R |

*Primary Examiner*—Charles A. Marmor
*Assistant Examiner*—Saul Rodriguez
*Attorney, Agent, or Firm*—Sixbey Friedman Leedom & Ferguson; Thomas W. Cole

[57] ABSTRACT

A slide cover structure for a shift lever device for covering an operation groove from the interior of a housing regardless of zigzag shifting operation of the shift lever, in which shifting operation is made by moving the shift lever in a first direction and a second direction, comprising: a first cover plate which is formed by a flexible member elongated in a first direction and opposes to the operation groove and is formed in the housing; and a second cover plate which is provided the opposite side of the operation groove with respect to the first cover plate and which is elongated in the second direction, in which widthwise edge portions of the second cover plate are supported by second supporting portions formed on the first cover plate; wherein a plurality of projections are provided so as to form protrusions and recesses in lines at the widthwise edge portions of the first cover plate at the surface of the first cover plate opposite the surface at which the operation groove is disposed to allow the distal ends of the plurality of projections to contact the first supporting portions provided in the housing so that gaps between the first supporting portions and the first cover plate are maintained to allow the second cover plate to move in the second direction.

20 Claims, 9 Drawing Sheets

SHIFT LEVER DEVICE AND SLIDE COVER STRUCTURE THEREFOR

BACKGROUND OF THE INVENTION

1. Field of the Invention

The present invention relates to a slide cover structure to cover an operation groove in a housing and to a shift lever device which uses the cover, which are used for shifting operation along the operation groove i.e., zigzag operation.

2. Description of the Related Art

A slide cover, for example, as is disclosed in Japanese Utility Model Application Laid-Open No. 64-47430 has been known. That is, as shown in FIGS. 8 to 10, an operation groove 104 of a step shape is formed in a housing fixed to a vehicle body, and a shift lever 106 is extended outward the housing 102 toward the upper direction (illustrated as an arrow "UP") of the vehicle. The shift lever 106 is supported at its lower end so as to be freely movable in the longitudinal direction (the front direction is shown as an arrow "FR.") and in the transverse direction (shown as an arrow "W") of the vehicle so that the shift lever 106 is operated along the operation groove 104.

A slide cover 108 is provided in the housing to cover the operation groove 104 so as not to be able to look in the interior of the housing 102 through the operation groove 104. The slide cover 108 comprises a first cover plate (main cover plate) 110 and a second cover plate (sub-cover plate) 112. The first cover plate 110 is provided within the housing 102 to oppose to the operation groove 104 and is elongated in the longitudinal direction of the vehicle. As shown in FIG. 10, the edge portions of the first cover plate 110 in the widthwise direction thereof (edge portions orthogonal to the longitudinal direction) are supported by guide rails 120 provided on the reverse surface of the housing 102. The first guide plate 110 is slidably movable in the longitudinal direction of the vehicle by being guided by the guide rails 120. An elongated hole 118 elongated in the widthwise direction of the first cover plate 110 is formed at the center in the longitudinal direction of the first cover plate 110. The above-described second cover plate 112 is provided so as to oppose to the elongated hole 118 at the reverse surface side of the first cover plate 110. As shown in FIG. 10, the edge portions in the widthwise direction (edge portions in the direction orthogonal to the longitudinal direction) of the second cover plate 112 are supported by guide rails 122 provided at the reverse surface of the first cover plate 110. The second cover plate 112 is slidably movable guided by the guide rails 122 in the transverse direction of the vehicle.

At the longitudinal direction center of the second cover plate 112, a cylinder 124 projects which passes through the above-described slot 118 to protrude in the upper direction (i.e., "UP" direction) of the vehicle. By moving the second cover plate 112 in the transverse direction of the vehicle, the cylinder 124 can slidably be moved in the slot 118. A shift lever 106 is provided so as to pass through the cylinder 124. When the shift lever is moved in the direction of the longitudinal direction of the vehicle, the first cover plate 110 is moved together with the second cover plate 112 in the same direction (i.e., the longitudinal direction of the vehicle). When the shift lever 106 moved in the transverse direction of the vehicle, only the second cover plate 112 is moved in the same direction (i.e., the transverse direction of the vehicle). Accordingly, the operation groove 104 can be covered by the first cover plate 110 and the second cover plate from the interior of the housing 102, regardless of the moving directions of the shift lever 106.

Here, each of the widthwise edge portions of the first cover plate 110 comprises an upright portion 114 projected upward and a horizontal portion 116 horizontally extended outwards from the top end of the upright portion 114, so as to form a step shape by bending. Each of the horizontal portions 116 is supported by the guide rail 120. When the second cover plate 112 moves in the transverse direction of the vehicle, it moves under the guide rails 120, as illustrated by chain lines in FIG. 8, so that the longitudinal edges of the second cover plate 112 do not interfere with the guide rails 120 and protrude outward from the widthwise edges of the first cover plate 110 (FIG. 8 illustrates the protruded state). Consequently, the dimension in the widthwise direction of the first cover plate 110 can be small. In addition, the first cover plate 110 is flexible and moved through a path (indicated by dashed line in FIG. 8) curved so as to have the center of curvature at the side opposite to the operation groove 104. That is, the path corresponding to the operation groove 104 is in the shape of a gentle arc or a substantially horizontal shape, while the path apart from the operation groove 104 is in the shape of a considerably curved arc so that when the shift lever 106 is moved in the forward direction or in the rearward direction, an accommodating space for end portions of the first cover plate 110 extended largely from the operation groove 102 in these directions owing to the movement of the shift lever 106 can be small.

Meanwhile, in the above-described conventional cover structure, the widthwise edge portions of the first cover plate 110 are stepwisely formed and the horizontal portions 116 are supported by the guide rails 120, and further, the second cover plate 112 is moved under the guide rails 120 so that dimension of the slide cover 108 in the vertical direction, i.e., dimension of thickness becomes larger. For the purpose of reducing the size of shift lever devices, it is required to reduce the dimension of thickness of the slide cover 108. In addition, the presence of the upright portions 114 to form steps at the widthwise edge portions of the first cover plate 110 increases the rigidity and reduces the flexibility of the slide cover.

SUMMARY OF THE INVENTION

In view of the above-described facts, the present invention is to provide a slide cover structure for a shift lever device and a shift lever device which uses the slide cover structure, in which sufficient flexibility of the slide cover is maintained and the dimension of thickness of a slide cover is reduced.

According to a first aspect of the present invention, a slide cover structure for a shift lever device for covering an operation groove from an interior of a housing regardless of zigzag shifting operation of the shift lever, in which the shift lever movable in a first direction and a second direction orthogonal to the first direction along the operation groove is extended outward from the operation groove formed in the housing, and shifting operation is made by moving the shift lever in the first and second directions, comprises:

a first cover plate which is formed by a flexible member elongated in a first direction and opposes to the operation groove formed in the housing, the first cover plate having a first through hole, through which a shift lever passes, elongated in a second direction, widthwise edge portions of the first cover plate orthogonal to the longitudinal direction of the first cover plate being supported by first supporting portions provided in the housing so that the first cover plate is slidably moved along a path required to be flexible in the first direction when the shift lever is moved in the first direction, and the first cover plate is capable of moving the shift lever along the elongated direction of the first through hole when the shift lever is moved in the second direction; and a second cover plate which opposes to the first through hole of the first cover plate at the opposite side of the operation groove with respect to the first cover plate and which is provided so as to be elongated in the second direction, the second cover plate has a second through hole through which the shift lever passes, widthwise edge portions orthogonal to the longitudinal direction of the second cover plate are supported by second supporting portions formed in the first cover plate, the second cover plate is slidably moved in the second direction such that the longitudinal edge portions of the cover plate protrude outward from the widthwise edge portions of the first cover plate when the shift lever is moved in the second direction, and the second cover plate is moved together with the first cover plate in the first direction when the shift lever is moved in the first direction; wherein a plurality of projections are provided so as to form protrusions and recesses in lines at the widthwise edge portions of the first cover plate along the longitudinal direction of the first cover plate at the surface of the first cover plate opposite the surface at which the operation groove is disposed to allow the distal ends of the plurality of projections to contact the first supporting portions so that gaps between the first supporting portions and the first cover plate are maintained to allow the second cover plate to move in the second direction.

According to a second aspect of the present invention, a shift lever device for shifting a shift lever, which projects outward from a housing through an operation groove formed in the housing and which is movable in a first direction and a second direction orthogonal to the first direction, by moving the shift lever in the first direction and the second direction along the operation groove so as to effect a zigzag operation, comprises:

a first supporting portion provided in the housing;

a first cover plate which is formed by a flexible member elongated in a first direction and opposed to the operation groove provided in the housing, the first cover plate having a first through hole, through which a shift lever passes, elongated in a second direction, widthwise edge portions of the first cover plate orthogonal to the longitudinal direction of the first cover plate being supported by first supporting portions so that the first cover plate is slidably moved along a path required to be flexible in the first direction when the shift lever is moved in the first direction, and the first cover plate being capable of moving the shift lever along the elongated direction of the first through hole when the shift lever is moved in the second direction; and a second cover plate which opposes to the first through hole of the first cover plate at the opposite side of the operation groove with respect to the first cover plate and which is provided so as to be elongated in the second direction, the second cover plate has a second through hole through which the shift lever passes, widthwise edge portions orthogonal to the longitudinal direction of the second cover plate are supported in the first cover plate, the second cover plate is slidably moved in the second direction such that the longitudinal edge portions of the second cover plate protrude outward from the widthwise edge portions of the first cover plate when the shift lever is moved in the second direction, and the second cover plate is moved together with the first cover plate in the first direction when the shift lever is moved in the first direction; wherein a plurality of projections are provided so as to form protrusions and recesses in lines at the widthwise edge portions of the first cover plate along the longitudinal direction of the first cover plate at the surface of the first cover plate opposite the surface at which operation groove is disposed to allow the distal ends of the plurality of projections to contact the first supporting portions so that gaps between the first supporting portions and the first cover plate are maintained to allow the second cover plate to move in the second direction, whereby:

the operation groove is covered from the interior of the housing regardless of movements of the shift lever.

In accordance with the above-described first and second aspects, the shift lever is moved along the operation groove in a zigzag operation to effect shifting operation.

By moving the shift lever in the first direction, the first cover plate is slidably moved in the first direction together with the second cover plate, and by moving the shift lever in the second direction, the shift lever is moved within the first through hole in the longitudinal direction and the second cover plate is slidably moved in the second direction. Consequently, the operation groove is always covered regardless of the movement of the shift lever.

When the second cover plate is moved in the second direction, the second cover plate is movable in gaps between the first supporting portions and the first cover plate, the gap being formed by abutment of a plurality of projections against the first supporting portions. The second cover plate is slidably moved in the second direction such that the longitudinal edge portions of the second cover plate protrude from the gaps outward beyond the widthwise edge portions of the first cover plate so that the second cover plate is not interfered with the first supporting portions.

Since a plurality of projections are provided so as to form protrusions and recesses in line along the longitudinal direction at the widthwise edge portions of the first cover plate, when the first cover plate is moved in the first direction, the first cover plate is easily flexed along a flex path of the first cover plate to maintain a smooth movement thereof.

At the same time, when the longitudinal edge portions of the second cover plate protrude from the widthwise edge portion of the first cover plate, the present invention is constituted in such a manner that the second cover plate is moved in the gaps between the first supporting portions and the first cover plate formed by the projections. Accordingly, the second cover plate is not required to move under the guide rails as in the conventional manner so that the thickness of the slide cover becomes small and reduction of the size of the shift lever device can be achieved.

DETAILED DESCRIPTION OF THE PREFERRED EMBODIMENT

Figure 1:
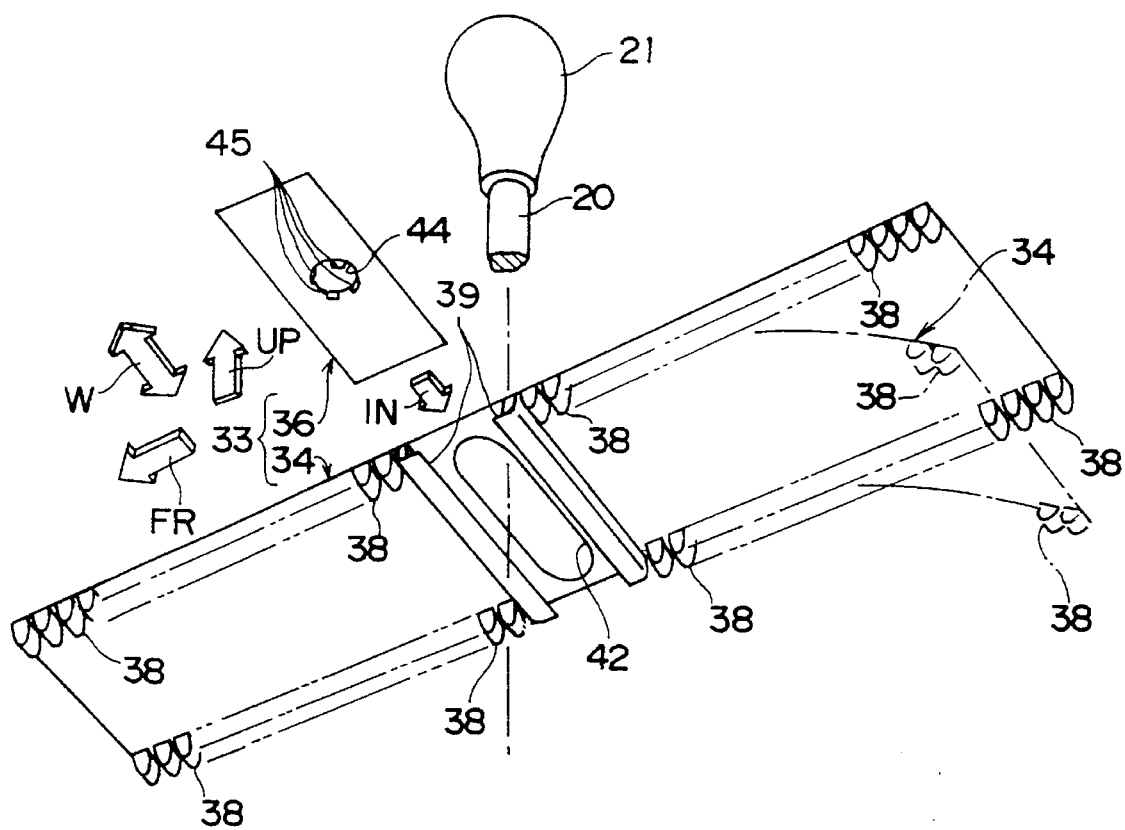
FIG. 1 is an exploded perspective view of a slide cover structure of a shift lever device, viewed from the lower side of a vehicle, according to an embodiment of the present invention.

An embodiment of a slide cover structure of a shift lever device according to the present invention will be described with reference to FIGS. 1 to 7. In the drawings, arrow "FR" shows the longitudinal direction of a vehicle, arrow "W" shows the transverse direction of the vehicle, and arrow "UP" shows the upper direction of the vehicle.

Figure 6:
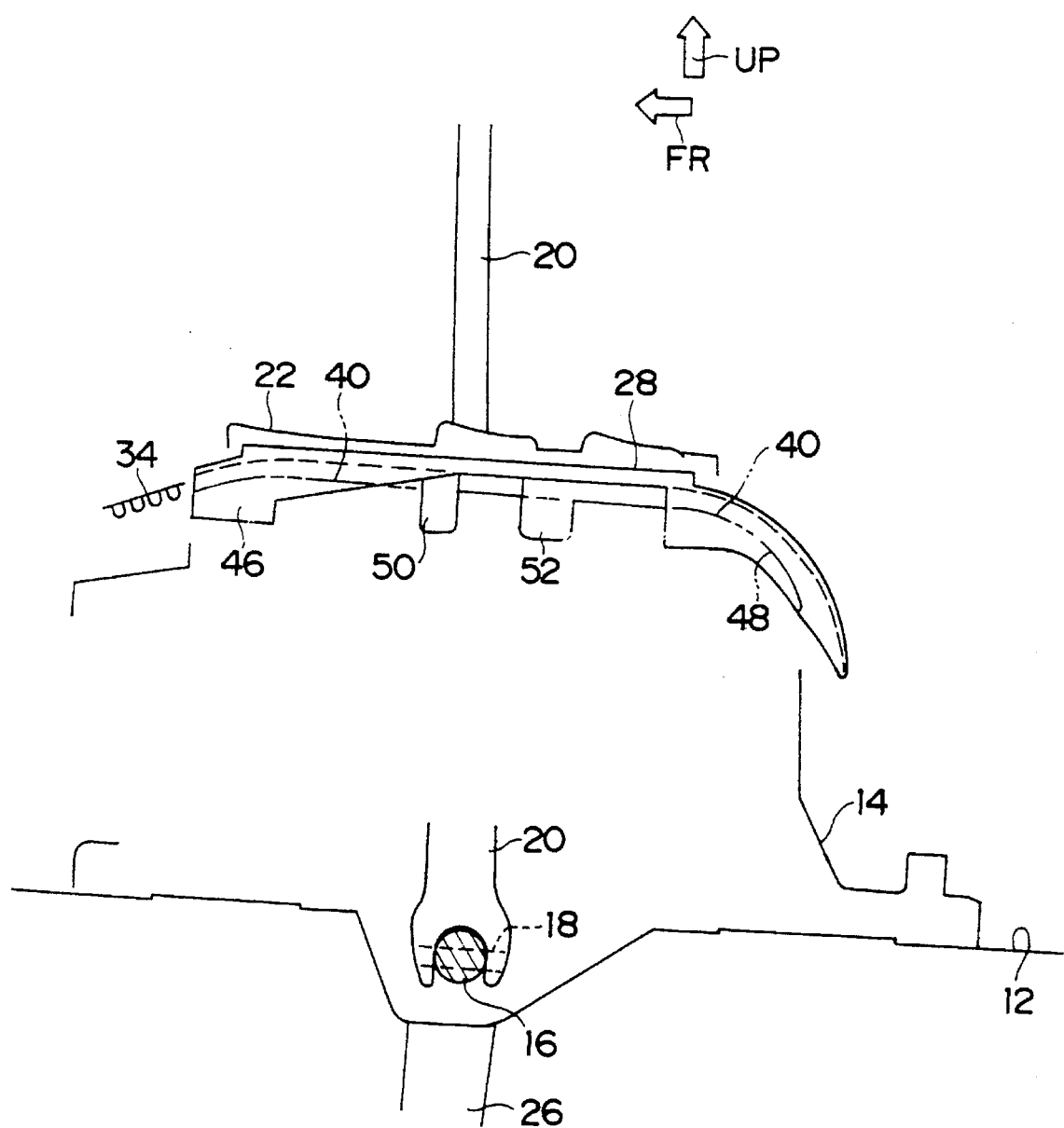
FIG. 6 is a schematic view of the shift lever device, viewed from the transverse direction of the vehicle, to which the slide cover structure according to the present embodiment is applied.
Figure 7:
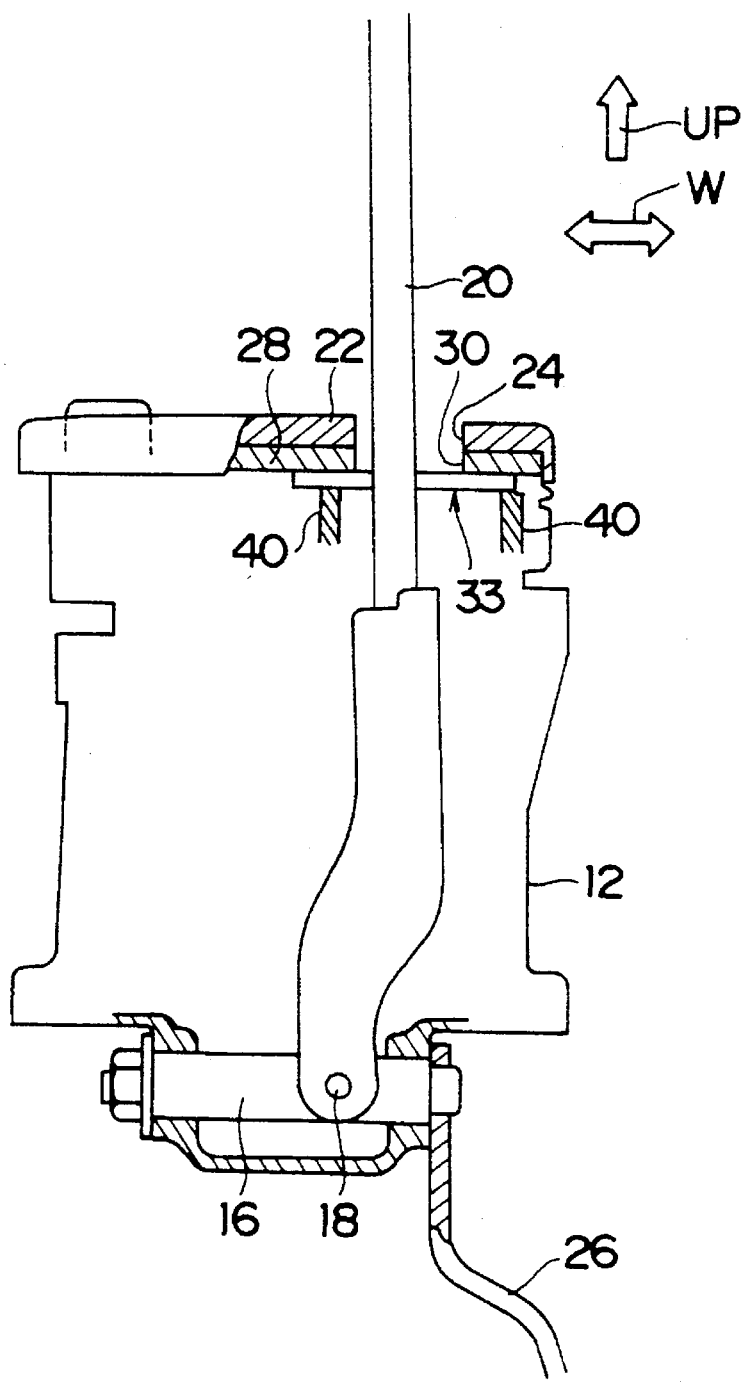
FIG. 7 is a schematic view of the shift lever device, viewed from the front or the rear direction of the vehicle, to which the structure of the slide cover according to the present embodiment is applied.
Figure 8:
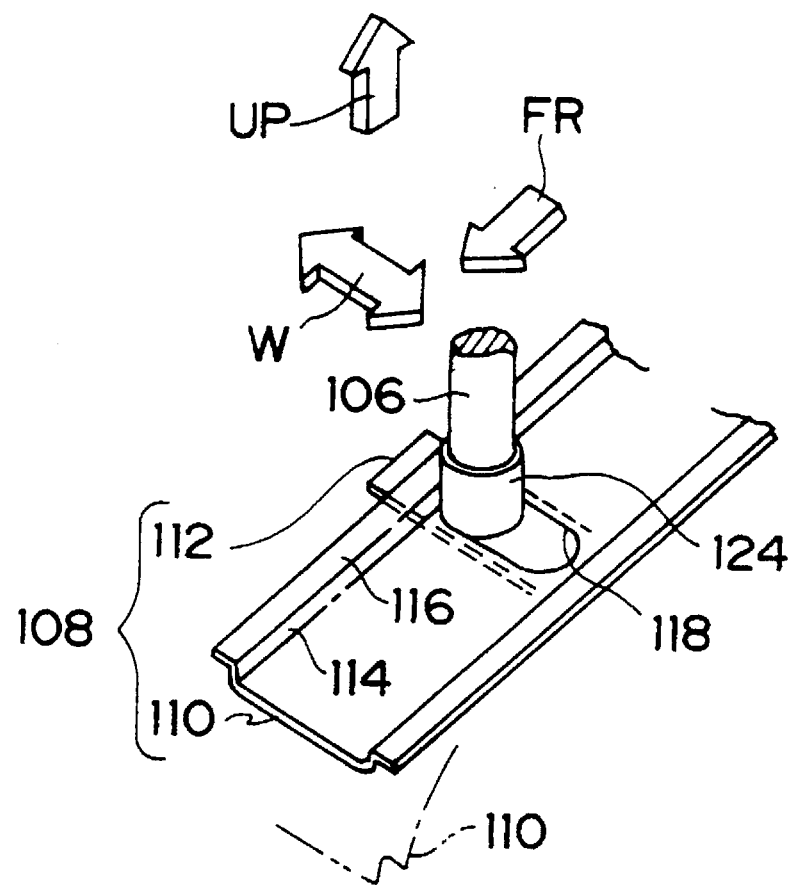
FIG. 8 is a perspective view of a slide cover structure of a conventional shift lever device, viewed from the upper side of a vehicle.
Figure 9:
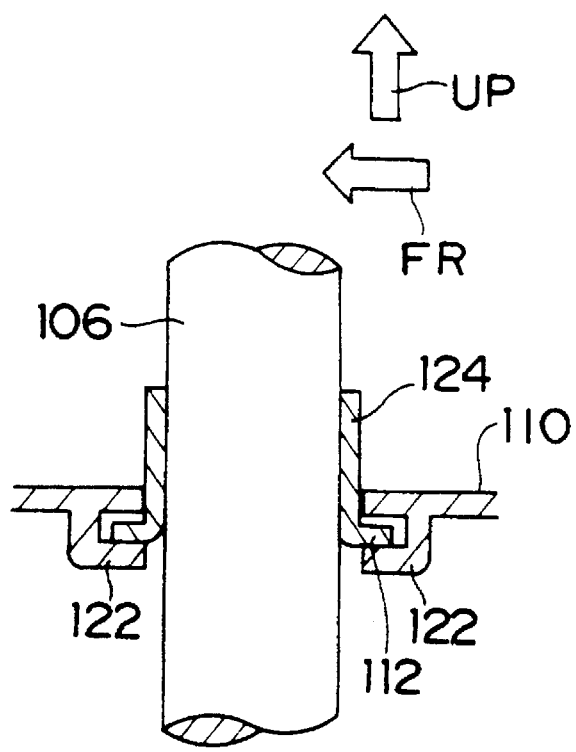
FIG. 9 is a vertical cross-sectional view of the slide cover of the conventional shift lever device, viewed from the transverse direction of the vehicle.
Figure 10:
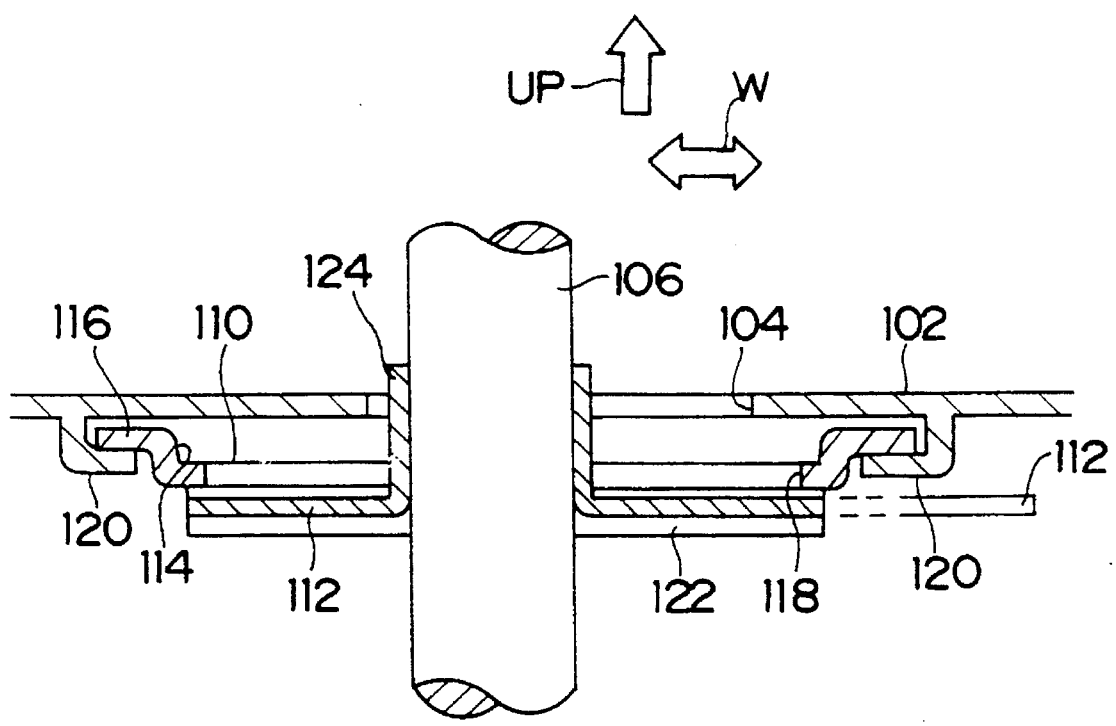
FIG. 10 is a vertical cross-sectional view of the slide cover of the conventional shift lever device, viewed from the longitudinal direction of the vehicle.

In a shift lever device of a vehicle, as shown in FIGS. 6 and 7, a mounting shaft 16, whose axial direction is substantially parallel to the transverse direction of the vehicle, is provided on a frame 14 fixed to a vehicle body 12, and a pin shaft 18 is provided through the mounting shaft 16, an axis of the pin shaft 18 being in a direction orthogonal to the axial direction of the mounting shaft 16 (i.e., the axis of the pin shaft 18 runs along the longitudinal direction of the vehicle).

The bottom end portion of a shift lever 20 is supported by the both axial ends of the pin shaft 18 so that the shift lever 20 is rotatable around the axis of the mounting shaft 16 and around the axis of the pin shaft 18.

Figure 5:
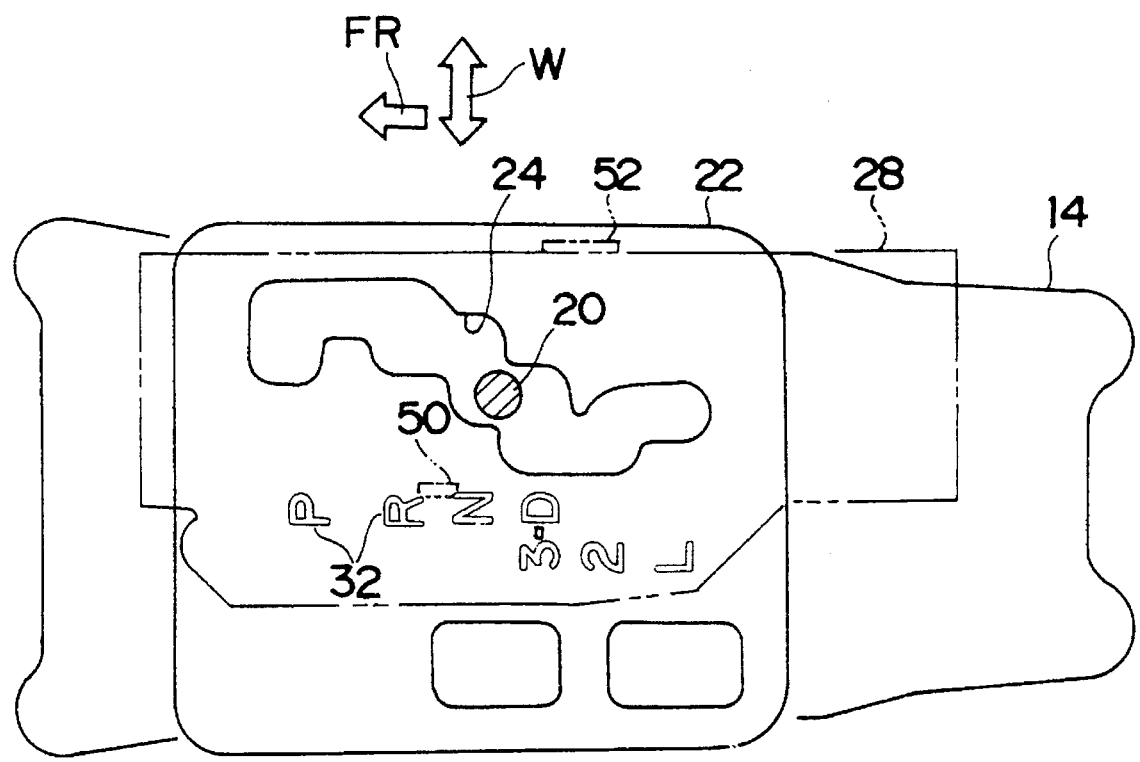
FIG. 5 is a schematic view of the shift lever device, viewed from the upper side of the vehicle, to which the slide cover structure according to the present embodiment is applied.

The upper part of the frame 14 is covered by a housing 22. As shown in FIG. 5, an operation groove 24 is formed in an upper wall of the housing 22 and an intermediate portion of the shift lever 20 is protruded outward from the housing 22. A shift lever knob 21 (see FIG. 1) is mounted on the top end portion of the shift lever 20. The operation groove 24 is formed in a stepwise shape and shift lever zigzag operations are carried out by moving the shift lever 20 along the operation groove 24 in the longitudinal direction, and in the transverse direction of the vehicle, respectively. P range, R range, N range, D range, 3 range, 2 range or L range is respectively selected in accordance with the position of the shift lever 20. The movement of the shift lever 20 is transmitted to a transmission which is not illustrated via an operation lever 26 (see FIG. 7) connected to the mounting shaft 16.

A light guide plate 28 is provided on the reverse surface of the upper wall of the housing 22, and a groove hole 30 is formed in the light guide plate 28 so as to oppose to the operation groove 24 and to be the same shape as that of the operation groove 24. The light guide plate 28 guides light from an unillustrated light source to illuminate the edges of the operation groove 24 to be distinctly observed the shape of the operation groove, and to illuminate a range display portion 32 corresponding to each shift range provided on the upper wall of the housing 22.

Figure 2:
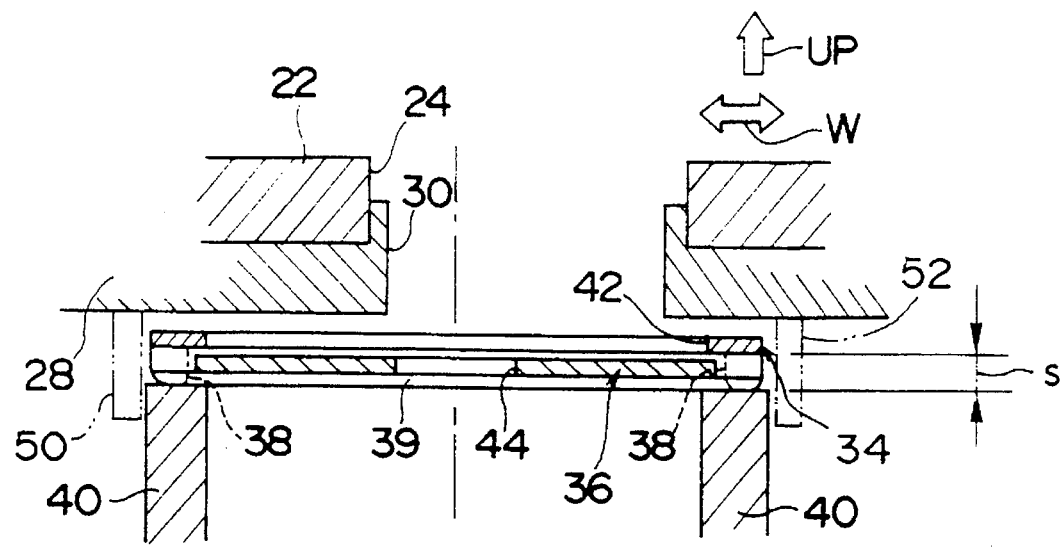
FIG. 2 is a vertical cross-sectional view of the slide cover structure of the shift lever device, viewed from the front or the rear side of the vehicle, according to the present embodiment.
Figure 3:
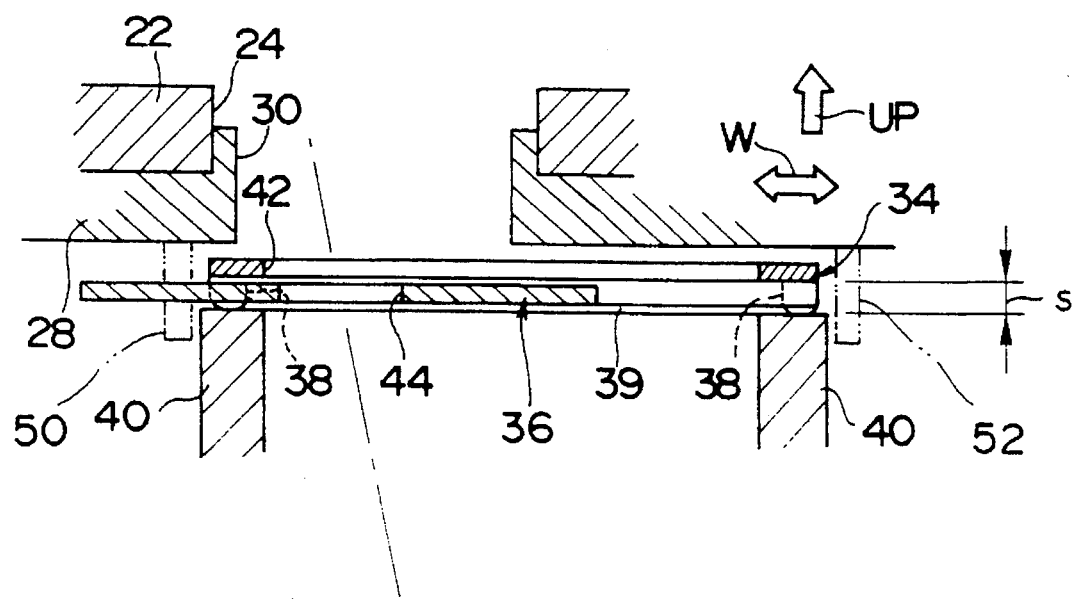
FIG. 3 is a vertical cross-sectional view of the slide cover structure of the shift lever device, viewed from the front or rear side of the vehicle when the second cover plate is moved in the transverse direction of the vehicle, according to the present embodiment.

As shown in FIGS. 1 to 3, a first cover plate (main cover plate) 34 and a second cover plate (sub-cover plate) 36 which constitute a slide cover 33 are provided under the light guide plate 28. The first cover plate 34 is formed by flexible material elongated in the longitudinal direction of the vehicle so as to oppose to the operation groove 24. From the reverse surface (surface opposite to the operation groove 24) of each of the both edges of the widthwise direction (direction orthogonal to the longitudinal direction) of the first cover plate 34, a plurality of projections 38 project in predetermined intervals so that projections and recesses are formed along the longitudinal direction of the first cover plate 34. The semi-circular rod-shaped projections 38 are substantially semi-circular when viewed from the widthwise direction of the first cover plate 34, and the rounded distal ends thereof abuts against supporting pieces (a first supporting portion) 40 which are formed projectingly upward from the frame 14.

The supporting pieces 40 and the light guide plate 28 are respectively extended from the operation groove 24 toward the longitudinal direction of the vehicle and a path for slidably moving the first cover plate 34 in the longitudinal direction of the vehicle is formed between the supporting pieces 40 and the light guide plate 28. A portion of the path corresponding to the operation groove 24 is substantially horizontal and outside portions of the path with respect to the operation groove 24 in the longitudinal direction of the vehicle are formed so as to be curved in an arc shape so that the center of curvature of the path is located in the opposite side of the operation groove 24 with respect to the first cover plate 34. The supporting pieces 40 are shown by two-dot chain line in FIG. 6. The length of the first cover plate 34 is longer than the length of the operation groove 24 in the longitudinal direction of the vehicle so that the first cover plate 34 can covers the operation groove 24 when the shift lever 20 is moved in the forward direction or in the rearward direction of the vehicle, and the first cover plate 34 is flexed (indicated by single-dot chain line in FIG. 1) along the above-described flexed path. Accordingly, when the shift lever 20 is moved in the front direction or In the rear direction of the vehicle, accommodation spaces for the edge portions of the first cover plate 34 protruding from the operation groove 24 owing to the movement of the shift lever 20 can be small.

Figure 4:
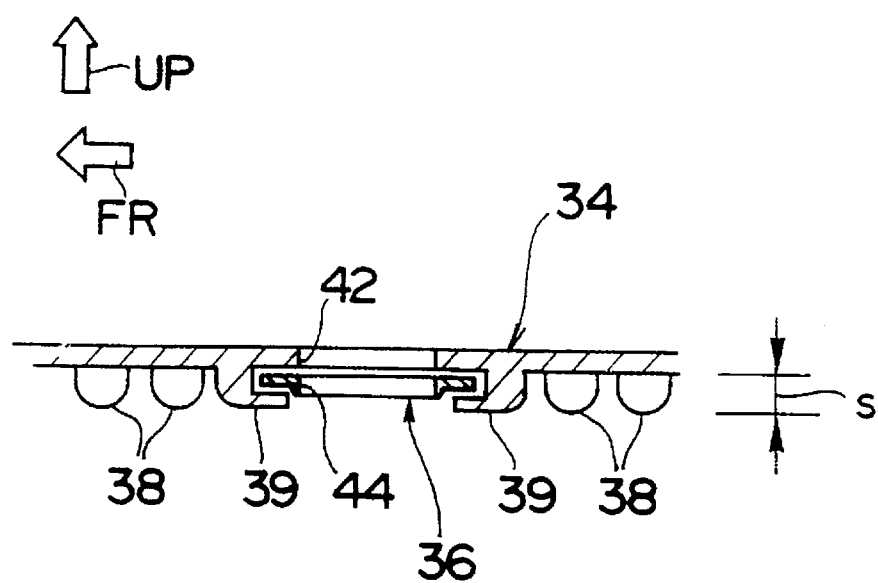
FIG. 4 is a vertical cross-sectional view of the slide cover structure of the shift lever device, viewed from the transverse direction, according to the present embodiment.

An elongated hole (a first through hole) 42 elongated in the widthwise direction or the first cover plate 34 is formed in an approximate center of the first cover plate 34 in the longitudinal direction. The above-described second cover plate 36 is provided at the reverse side of the first cover plate 34 to oppose to the slot 42. The second cover plate 36 is approximately extended to the length in the widthwise direction of the first cover plate 34 and is elongated in the widthwise direction of the first cover plate 34. The both edge portions in the widthwise direction (direction orthogonal to the longitudinal direction) of the second cover plate 36 are supported by substantially L-shaped guide rails (second supporting portions) 39 which are projected from the reverse surface of the first cover plate 34 and are formed integrally with the first cover plate 34 (the mounting direction of the first cover plate 34 in the guide rails 39 of the first cover plate 34 is shown by arrow "IN" in FIG. 1). The second cover plate 36 is slidably movable in the widthwise direction of the first cover plate 34 by being guided by the guide rails 39. The guide rails 39 are formed over the full length in the widthwise direction of the first cover plate 34. The reverse surfaces of the guide rails 39 are substantially coplanar with the distal ends of the above-described projections 38 and abut against the above-described supporting pieces 40. Meanwhile, as shown in FIG. 4, the projections 38 are not formed between the guide rails 39. A gap s is formed and maintained between the distal ends of the projections 38 (i.e., the upper surface of the supporting pieces 40) and the reverse surface of the first cover plate 34 so as to be movable in the transverse direction of the vehicle for the second cover plate 36. That is, when the second cover plate 36 is moved from the state as shown in FIG. 2 to the transverse direction of the vehicle, the longitudinal ends of the second cover plate 36 do not interfere with the supporting pieces 40, as shown in FIG. 3, so that the ends of the second cover plate 36 pass through the widthwise ends of the first cover plate 34 to protrude outward from the gap s. Consequently, it is sufficient that the widthwise size of the first cover plate 34 is small. In FIGS. 2 and 3, the axis of the shift lever 20 is shown by single-dot chain lines.

A circular hole (a second through hole) 44 is formed in the center of the longitudinal direction of the second cover plate 36, and the shift lever 20 passes through the round hole 44 and the above described slot 42. A plurality of projections 45 are formed on the periphery of the round hole 44 and the projections 45 press resiliently the periphery of the shift lever 20 so that the shift lever 20 fits well in the round hole 44.

When the shift lever 20 is moved in the longitudinal direction of the vehicle, the first cover plate 34 is moved together with the second cover plate 36 in the same directions (i.e., in the longitudinal direction of the vehicle). When the shift lever 20 is moved in the transverse direction of the vehicle, the shift lever 20 is moved in the longitudinal direction of the elongated hole 42 and the second cover plate 36 is moved in the same direction (i.e., in the transverse direction of the vehicle).

In addition, as shown in FIG. 6, on the both right and left sides in the widthwise direction of each portion of the extended portions toward the longitudinal direction, guiding side portions 46 and 48 as guiding members are formed in parallel with one another downwardly in a curved manner. The parallel widthwise edges of the first cover plate 34 abut against the guiding side portions 46 and 48 so that movements of the first cover plate 34 in the widthwise direction are restricted. In addition, guiding foot portions 50 and 52 as guiding members are provided projectingly at the both widthwise sides of the substantially center of the light guide plate 28 in the longitudinal direction of the vehicle and the guiding foot portions 50 and 52 abut against the widthwise edges of the first cover plate 34 respectively, so that movements of the first cover plate 34 in the widthwise directions are restricted (see FIG. 2). The locations of the guiding foot portions 50 and 52 are out of alignment in the longitudinal direction of the vehicle so that when the second cover plate 36 moves in the transverse direction of the vehicle, protrusions of the edges of the second cover plate 36 in the longitudinal direction outward from the widthwise edges of the first cover plate 34 are not interfered with the guiding foot portions 50 and 52.

Next, the operation of the above-described embodiment will be described hereinafter.

Zigzag shifting operations are made by moving the shift lever 20 along the operation groove 24. When the shift lever 20 is moved in the longitudinal direction, the first cover plate 34 is slidably moved in the longitudinal direction of the vehicle together with the second cover plate 36. When the shift lever 20 is moved in the transverse direction of the vehicle, the shift lever 20 is moved in the elongated hole 42 in the longitudinal direction of the elongated hole 42 and the second cover plate 36 is slidably moved in the transverse direction of the vehicle. Accordingly, the operation groove 24 is covered in the housing 22 regardless of movements of the shift lever 20.

Gaps s between the supporting pieces 40 and the first cover plate 34 are maintained by the abutment of the distal ends of the projections 38 of the first cover plate 34 against the supporting pieces 40. The guide rails 39 are provided within the range of the gaps s so that the second cover plate 36 can be moved within the range of the gaps s when the second cover plate 36 is moved in the transverse directions of the vehicle. Further, the edge portions of the second cover plate 36 in the longitudinal direction can protrude beyond the widthwise edge portions of the first cover plate 34 and the second cover plate 36 does not interfere with the supporting pieces 40.

A plurality of projections 38 are formed in lines to form projections and recesses along the longitudinal direction at the edge portions in the widthwise directions of the first cover plate 34 so that the first cover plate 34 is easily flexed along the flexed path of the first cover plate 34 to maintain smooth movements thereof. The first over plate 34 is flexed so that adjacent projections 38 are close to each other.

At the same time, when the edge portions of the second cover plate 36 in the longitudinal direction protrude from the widthwise edge portions of the first cover plate 34, the present invention is constituted in such a manner that the second cover plate 36 is moved within the gaps between the supporting pieces 40 and the first cover plate 34 formed by the projections 38. Accordingly, the second cover plate 36 is not required to move under the guide rails as in the conventional manner so that the dimension in the thickness direction is shortened and reduction of the size of the shift lever device can be achieved.

The present invention is not limited to the above-described embodiment, but various modifications and changes can be made. For example, descriptions regarding a shift lever device of a vehicle were made in the above embodiment, but the present invention is not limited to a vehicle. Further, the shape or projections is not limited to the above-described embodiment.

Furthermore, in the above embodiment, the base portions of projections 38 adjacent to each other along the longitudinal direction of the first cover plate 34 are set slightly apart from each other, but the base portions may contact each other. The projections may be formed along the longitudinal direction of the first cover plate so as to form projections and recesses in a plurality of numbers in line.

With the slide cover structure in accordance with the present invention, sufficient flexibility can be maintained and the dimension in the thickness direction can be shortened.

What is claimed is:

1. A slide cover structure for a shift lever device for covering an operation groove from an interior of a housing regardless of zigzag shifting operation of the shift lever, in which the shift lever movable in a first direction and a second direction orthogonal to the first direction along the operation groove is extended outward from the operation groove formed in the housing, and shifting operation is made by moving the shift lever in the first and second directions, comprising:

a first cover plate which is formed by a flexible member elongated in a first direction and opposes to said operation groove formed in the housing, said first cover plate having a first through hole, through which a shift lever passes, elongated in a second direction widthwise edge portions of said first cover plate orthogonal to the longitudinal direction of said first cover plate being supported by first supporting portions provided in the housing so that said first cover plate is slidably moved along a path required to be flexible in the first direction when the shift lever is moved in the first direction, and said first cover plate is capable of moving the shift lever along the elongated direction of the first through hole when the shift lever is moved in the second direction; and a second cover plate which opposes to said first through hole of said first cover plate at the opposite side of said first cover plate with respect to an operation groove and which is provided so as to be elongated in the second direction, said second cover plate has a second through hole through which the shift lever passes, widthwise edge portions orthogonal to the longitudinal direction of said second cover plate are supported by second supporting portions formed in said first cover plate, said second cover plate is slidably moved in the second direction such that a longitudinal edge portions of said cover plate protrude outward from the widthwise edge portions of the first cover plate when the shift lever is moved in the second direction, and said second cover plate is moved together with said first cover plate in the first direction when the shift lever is moved in the first direction; wherein a plurality of projections are provided so as to form protrusions and recesses in lines at the widthwise edge portions of the first cover plate along the longitudinal direction of the first cover plate at a surface of said first cover plate opposite the surface at which the operation groove is disposed to allow distal ends of said plurality of projections to contact the first supporting portions so that gaps between the first supporting portions and the first cover plate are maintained to allow said second cover plate to move in the second direction.

2. A slide cover structure for a shift lever device according to claim 1, wherein the cross-section of said plurality of projections is formed substantially in a semi-circular shape.

3. A slide cover structure for a shift lever device according to claim 2, wherein each of said plurality of projections is formed so as to be a semi-circular rod shape which has an axis substantially along the widthwise direction of said first cover plate.

4. A slide cover structure for a shift lever device according to claim 1, wherein each of said plurality of projections is formed so as to be a semi-circular rod shape which has an axis substantially along the widthwise direction of said first cover plate.

5. A slide cover structure for a shift lever device according to claim 1, wherein said second supporting members are a pair of guide rails provided in the vicinity of both edge portions in the widthwise direction of said first through hole.

6. A slide cover structure for a shift lever device according to claim 5, wherein the both edges of each of said pair of guide rails in the longitudinal direction are formed so as to substantially correspond to the edges in the widthwise direction of said first cover plate.

7. A slide cover structure for a shift lever device according to claim 6, wherein said plurality of projections are formed in areas except for an area between said pair of guide rails.

8. A slide cover structure for a shift lever device according to claim 1, wherein said second supporting members are formed integrally with said first cover plate.

9. A slide cover structure for a shift lever device according to claim 1, wherein said plurality of projections are provided at predetermined intervals in such a manner that said first cover plate can be flexed with the center of curvature at the side of said plurality of projections.

10. A shift lever device for shifting a shift lever, which projects outward from a housing through an operation groove formed in the housing and which is movable in a first direction and a second direction orthogonal to the first direction, by moving the shift lever in the first direction and the second direction along the operation groove so as to effect a zigzag operation, comprising:

a first supporting portion provided in the housing;

a first cover plate which is formed by a flexible member elongated in a first direction and opposed to said operation groove provided in the housing, said first cover plate having a first through hole, through which a shift lever passes, elongated in a second direction, widthwise edge portions of said first cover plate orthogonal to the longitudinal direction of said first cover plate being supported by first supporting portions so that said first cover plate is slidably moved along a path and required to be flexible in the first direction when the shift lever is moved in the first direction, and said first cover plate being capable of moving the shift lever along the elongated direction of the first through hole when the shift lever is moved in the second direction; and a second cover plate which opposes to said first through hole of said first cover plate at the opposite side of said first cover plate with respect to an operation groove and which is provided so as to be elongated in the second direction, said second cover plate has a second through hole through which the shift lever passes, widthwise edge portions orthogonal to the longitudinal direction of said second cover plate are supported in said first cover plate, said second cover plate is slidably moved in second direction such that the longitudinal edge portions of said second cover plate protrude outward from the widthwise edge portions of the first cover plate when the shift lever is moved in the second direction, and said second cover plate is moved together with said first cover plate in the first direction when the shift lever is moved in the first direction; wherein a plurality of projections are provided so as to form protrusions and recesses in lines at the widthwise edge portions of the first cover plate along the longitudinal direction of the first cover plate at a surface of said first cover plate opposite the surface at which the operation groove is disposed to allow distal ends of said plurality of projections to contact the first supporting portions so that gaps between the first supporting portions and the first cover plate are maintained to allow said second cover plate to move in the second direction, whereby:

the operation groove is covered from the interior of the housing regardless of movements of the shift lever.

11. A shift lever device according to claim 10, further comprising:

guiding members for guiding said first cover plate in the first direction.

12. A shift lever device according to claim 11, wherein said guiding members are formed on a plate-like member disposed between the housing and said first cover plate.

13. A shift lever device according to claim 10, wherein the cross-section of said plurality of projections is formed substantially in a semi-circular shape.

14. A shift lever device according to claim 13, wherein each of said plurality of projections is formed so as to be a semi-circular rod shape which has an axis substantially along the widthwise direction of said first cover plate.

15. A shift lever device according to claim 10, wherein each of said plurality of projections is formed so as to be a semi-circular rod shape which has an axis substantially along the widthwise direction of said first cover plate.

16. A shift lever device according to claim 10, wherein said second supporting members are a pair of guide rails provided in the vicinity of the both edge portions in the widthwise direction of said first through hole.

17. A shift lever device according to claim 16, wherein the both edges of each of said pair of guide rails in the longitudinal direction are formed so as to substantially correspond to the edges in the widthwise direction of said first cover plate.

18. A shift lever device according to claim 17, wherein said plurality of projections are formed in areas except for an area between said pair of guide rails.

19. A shift lever device according to claim 10, said second supporting members are formed integrally with said first cover plate.

20. A shift lever device according to claim 10, wherein said plurality of projections are provided at predetermined intervals in such a manner that said first cover plate can be flexed with the center of curvature at the side of said plurality of projections.

* * * * *